(No Model.)

G. P. YEAKEL.
WHEEL.

No. 569,703. Patented Oct. 20, 1896.

Witnesses:
F. L. Ourand
W. L. Coombs

Inventor:
George P. Yeakel,
by Louis Bagger & Co.
Attorneys

UNITED STATES PATENT OFFICE.

GEORGE P. YEAKEL, OF ROYERSFORD, PENNSYLVANIA.

WHEEL.

SPECIFICATION forming part of Letters Patent No. 569,703, dated October 20, 1896.

Application filed January 13, 1896. Serial No. 575,371. (No model.)

*To all whom it may concern:*

Be it known that I, GEORGE P. YEAKEL, a citizen of the United States, and a resident of Royersford, in the county of Montgomery and State of Pennsylvania, have invented certain new and useful Improvements in Wheels; and I do hereby declare that the following is a full, clear, and exact description of the invention, which will enable others skilled in the art to which it appertains to make and use the same, reference being had to the accompanying drawings, which form a part of this specification.

My invention relates to improvements in that class of wheels which are provided with cushion or pneumatic tires; and its object is to provide an improved construction of the same which shall possess superior advantages with respect to efficiency in use.

The invention consists in the novel construction and combination of parts hereinafter fully described and claimed.

Figure 1:
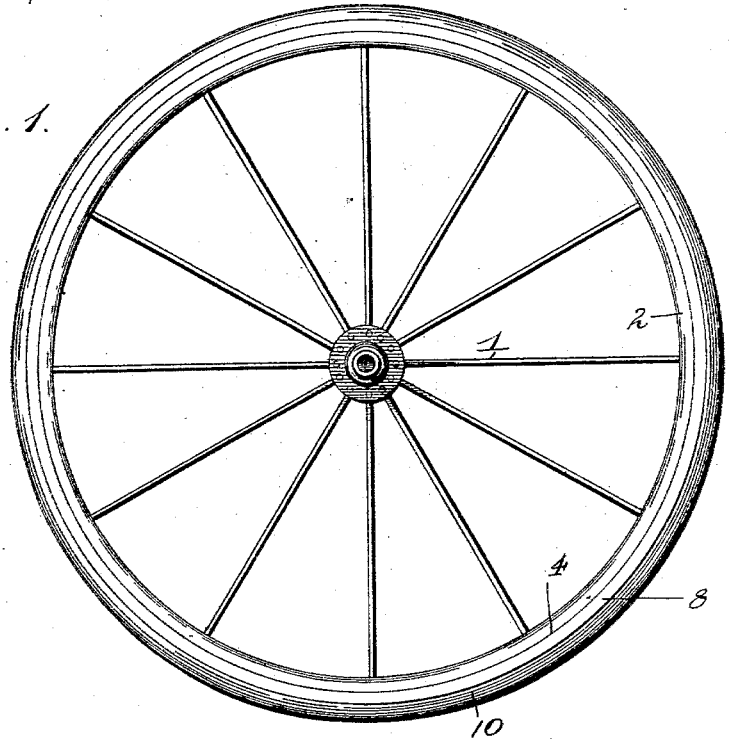
Figures 2, 3:
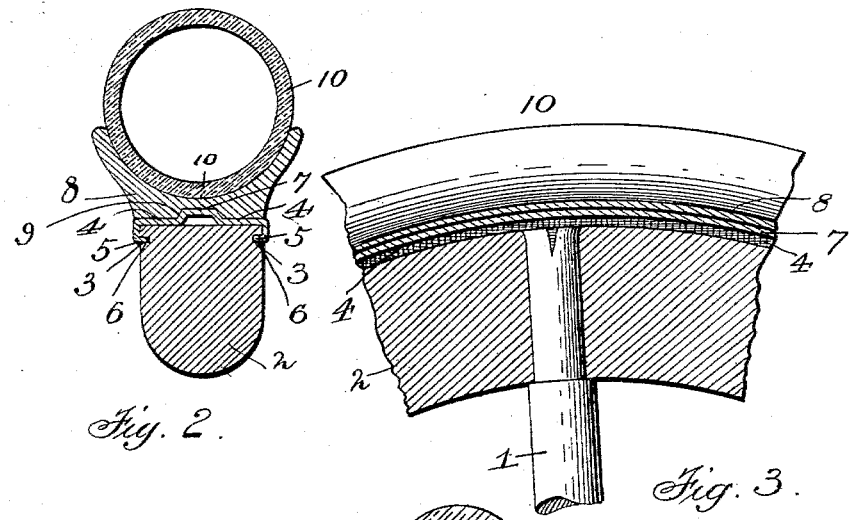
Figure 4:
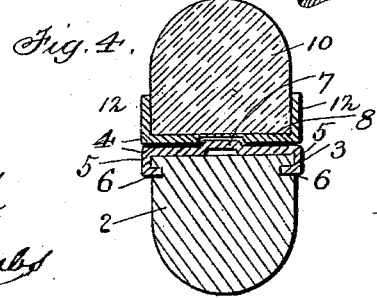

In the accompanying drawings, Figure 1 is an elevation of a portion of a wheel constructed in accordance with my invention. Fig. 2 is a cross-section on the line *x x*, Fig. 1. Fig. 3 is a detail longitudinal section. Fig. 4 is a cross-sectional view of a modified construction.

In the said drawings the reference-numeral 1 designates the spokes, and 2 the fellies. The fellies at each side are rabbeted, as shown at 3, and engaging therewith is a plate 4, the edges of which are bent at approximately right angles, forming flanges 5, formed at suitable distances apart with spurs or prongs 6, which are driven into the fellies and serve to hold the plate in place. This plate is formed with a central rectangular projection 7, extending from end to end thereof.

The numeral 8 designates a rim formed on its inner side with a groove 9, corresponding with the projection 7. This rim is approximately semicylindrical in form to receive a rubber cushion or pneumatic tire 10, which is secured thereto by cement or otherwise. This rim is reinforced at its center and is formed with a groove 9, with which the projection 7 engages.

In making the wheel the plate is first placed on the wheel. The rim is then shrunk on said plate and the plate is secured thereto by driving the prongs thereof into the fellies and the cushion or pneumatic tire secured thereto.

By the above construction it will be seen that no bolts, screws, or rivets are employed, and that a wheel is produced which is strong and durable in use and efficient in operation.

In Fig. 4 I have shown a modified construction so that a rubber or pneumatic tire having a flat inner surface and straight sides may be employed. In this construction the rim instead of being formed with a semicircular groove has a flat bearing-surface for the tire with straight walls 12. In this construction, also, the outer surface of the fellies is formed with a groove with which engages the groove 7 of the rim 8, this projection in the present instance extending in an opposite direction to that shown in the other figures.

Having thus fully described my invention, what I claim is—

In a wheel, the combination with the fellies rabbeted at opposite sides, of the bent plate provided with prongs driven into the fellies and formed with a rectangular projection, the rim having a groove with which said depression engages and the tire secured to said rim; substantially as described.

In testimony that I claim the foregoing as my own I have hereunto affixed my signature in presence of two witnesses.

GEORGE P. YEAKEL.

Witnesses:
M. B. LINDERMAN,
E. L. MARKLEY.